Figure 4:
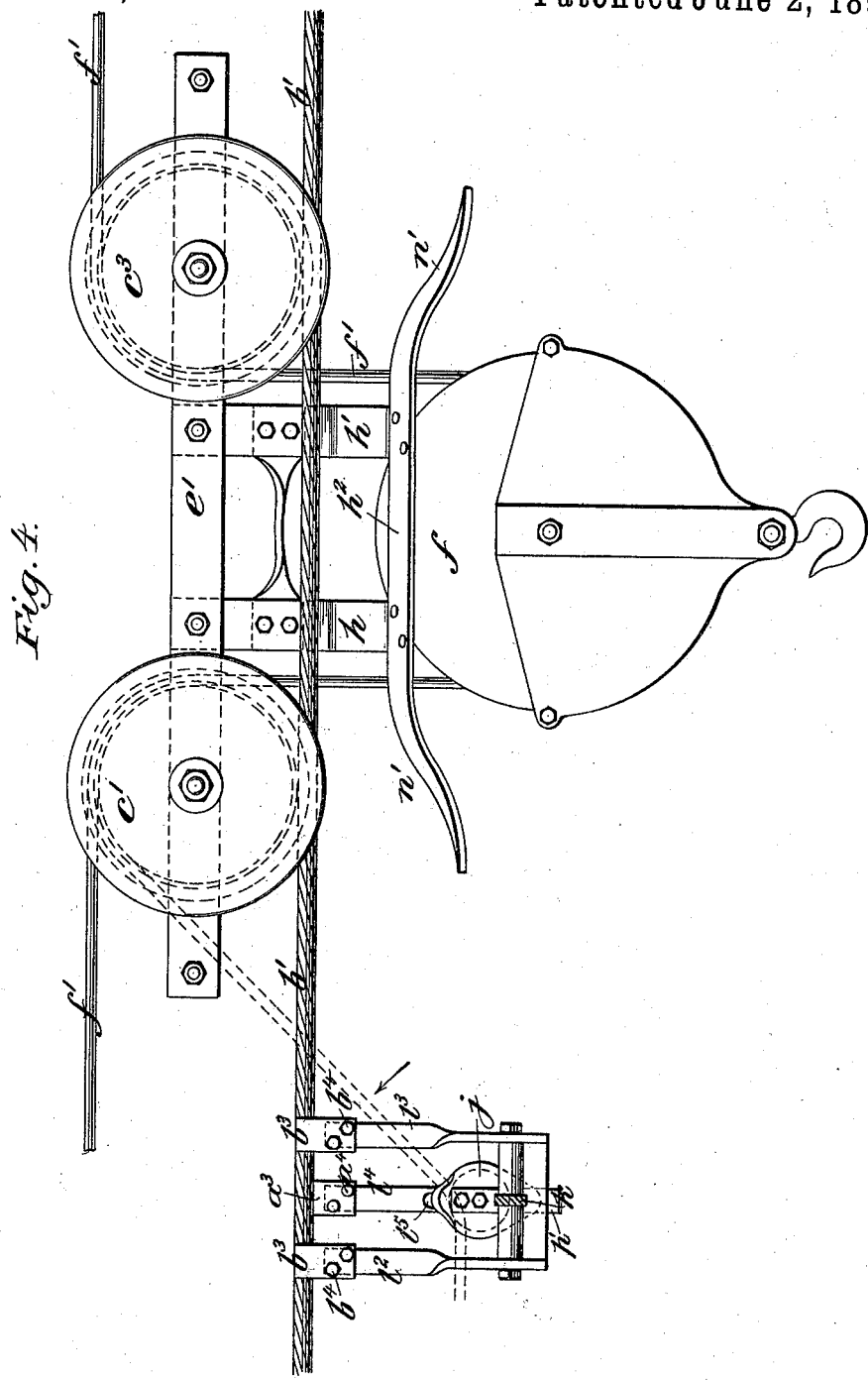

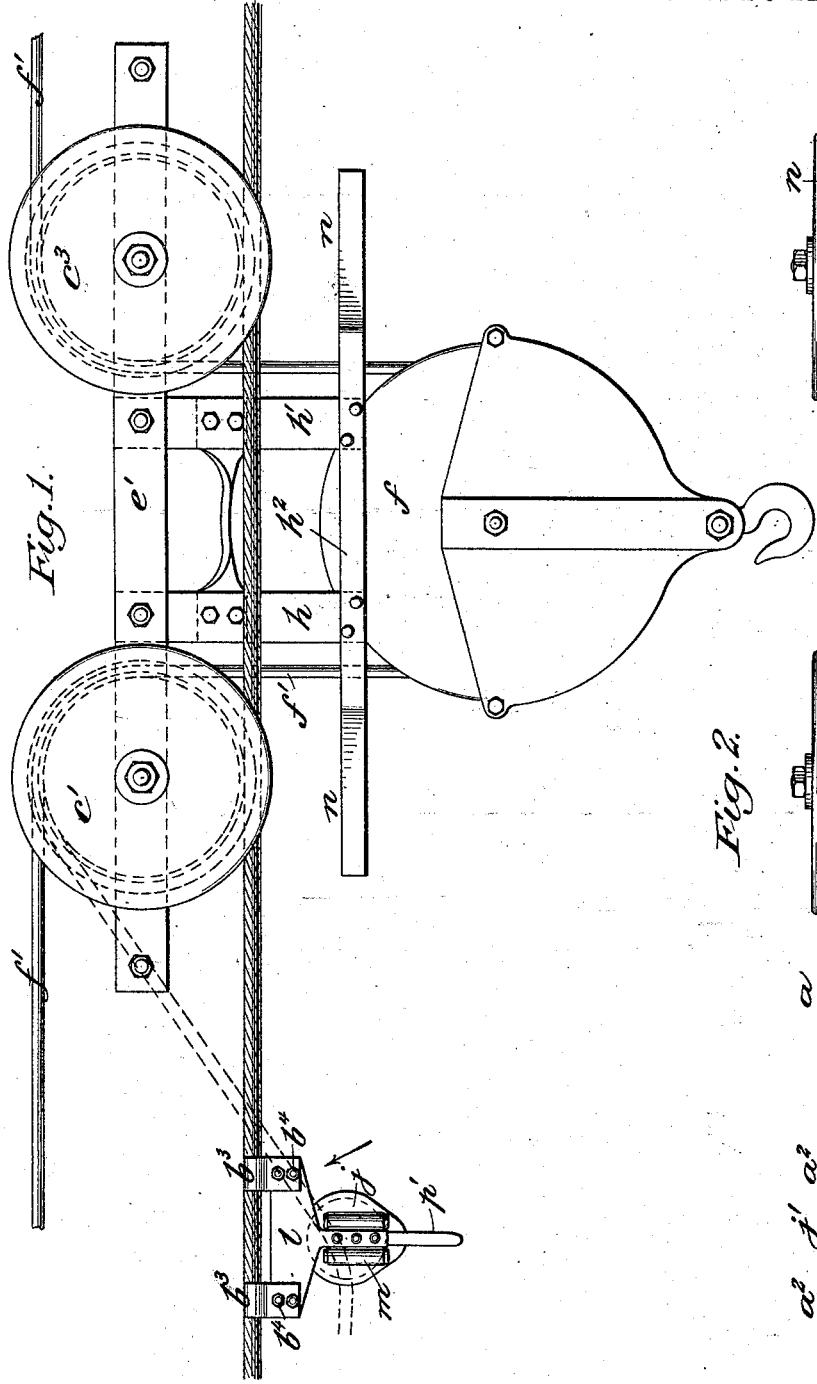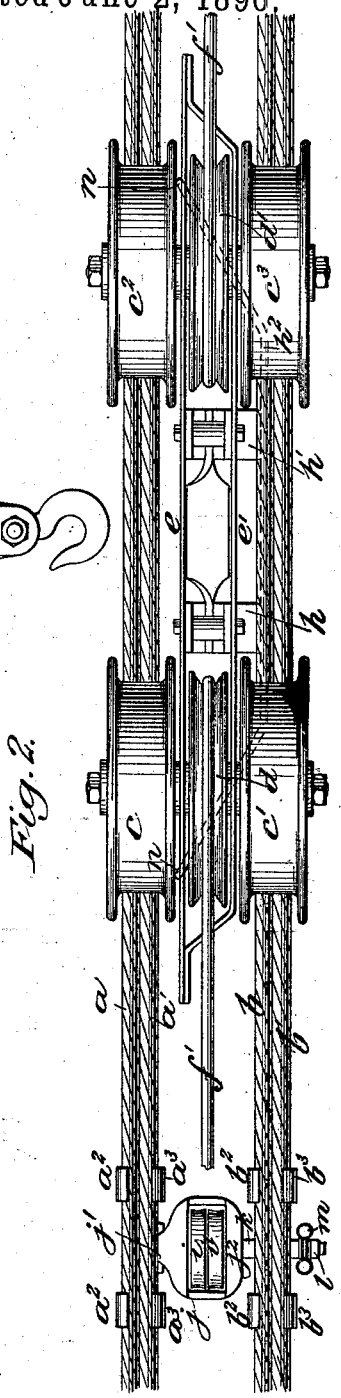

(No Model.) 4 Sheets—Sheet 2.
T. S. MILLER.
CONVEYING APPARATUS.
No. 561,334. Patented June 2, 1896.
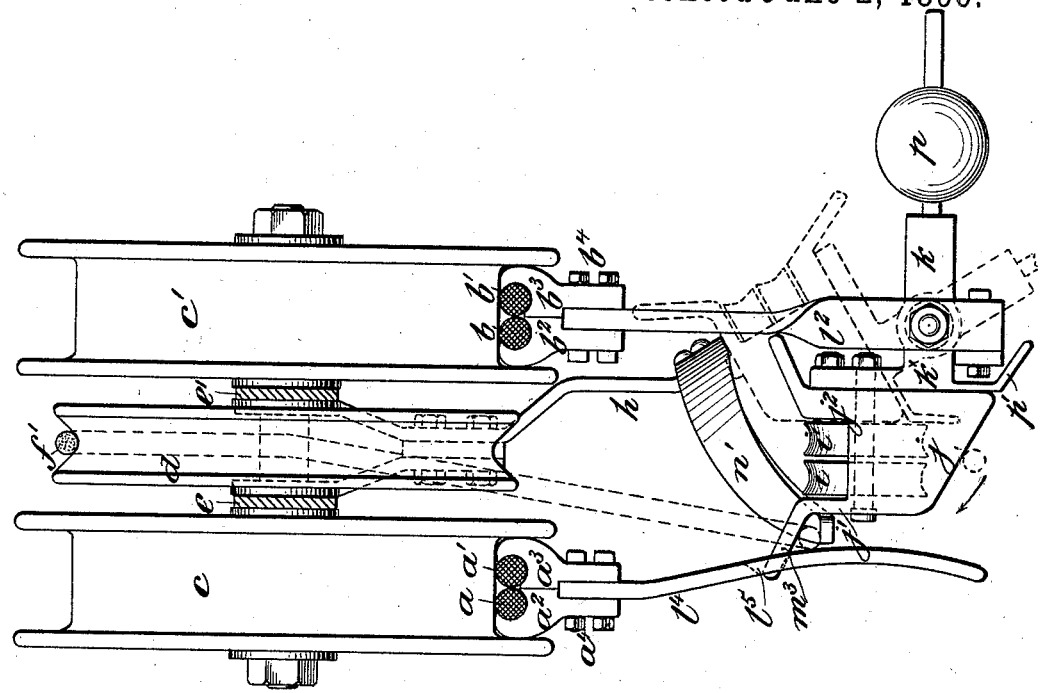
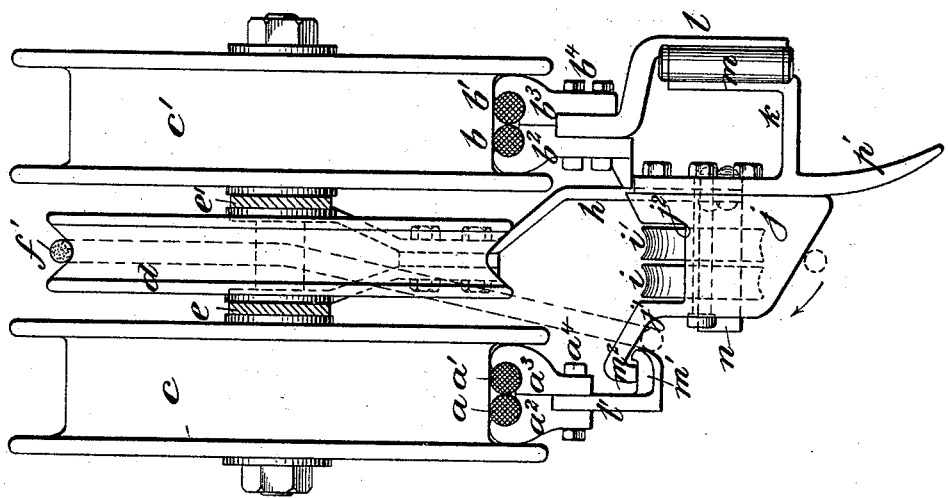
Witnesses:
O. H. Hayford
Fred S. Kemper
Inventor:
Thomas Spencer Miller
by Gifford & Saw.
Attorneys.

(No Model.)  
T. S. MILLER.  
CONVEYING APPARATUS.  
No. 561,334.  
4 Sheets—Sheet 3.  
Patented June 2, 1896.

Witnesses:  
D. H. Hayward  
Fred S. Kemper

Inventor:-  
Thomas Spencer Miller  
by Gifford & Law  
Attorneys.

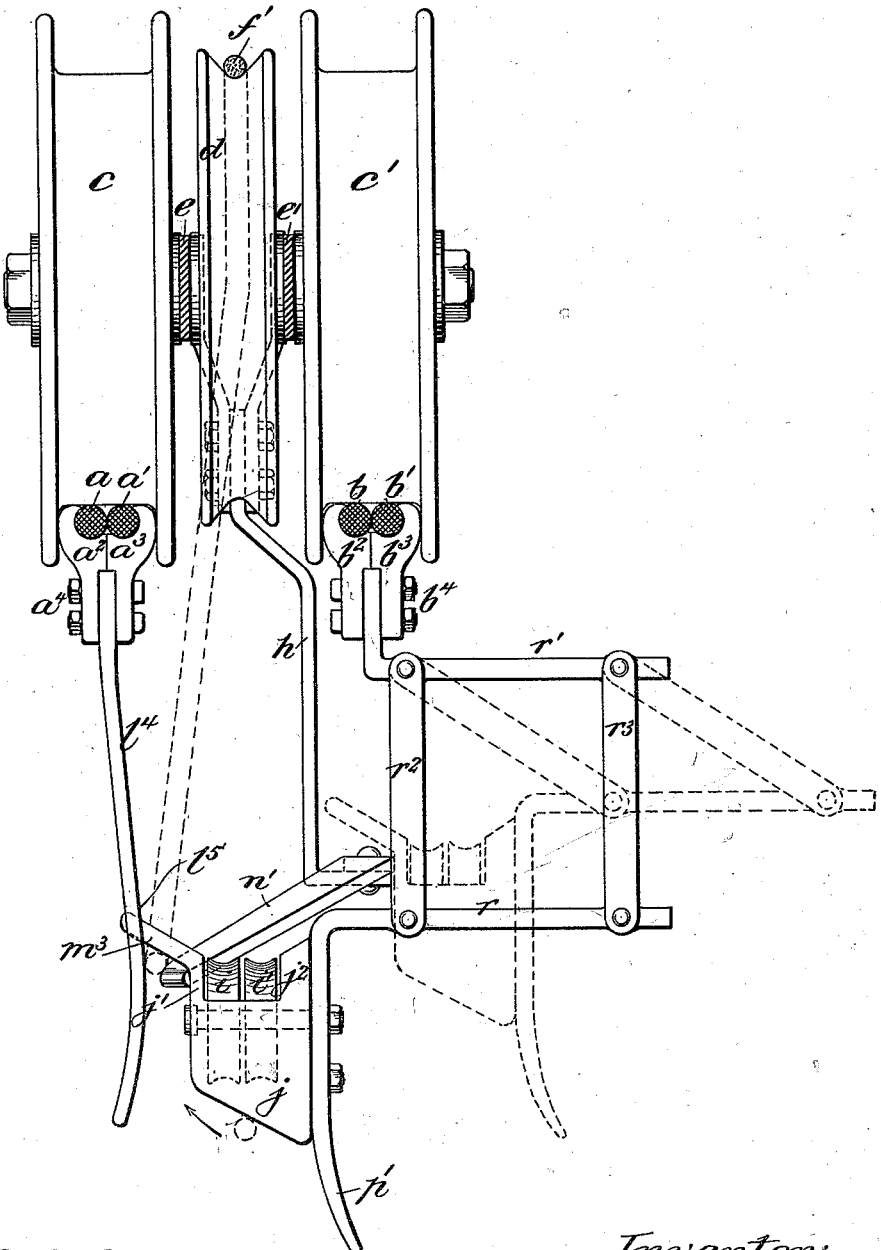

UNITED STATES PATENT OFFICE.

THOMAS SPENCER MILLER, OF SOUTH ORANGE, NEW JERSEY.

CONVEYING APPARATUS.

SPECIFICATION forming part of Letters Patent No. 561,334, dated June 2, 1896.

Application filed May 8, 1893. Serial No. 473,415. (No model.)

*To all whom it may concern:*

Be it known that I, THOMAS SPENCER MILLER, of South Orange, in the State of New Jersey, have invented a new and useful Improvement in Conveying Apparatus, of which the following is a specification.

The invention which is the subject of the present specification consists in that which is in common between the three forms hereinafter described, and also that which is contained particularly in the third of such forms.

The first form is illustrated in the accompanying drawings in Figure 1, which is a side view; Fig. 2, which is a plan view, and Fig. 3, which is an end view. The second form of construction is shown in Fig. 4, which is a side view, and Fig. 5, which is an end view. The third form of construction is shown in Fig. 6.

I will first set forth those parts in which the three forms are alike.

I prefer to construct each trackway of two cables $a$ $a'$ and $b$ $b'$, lying side by side in contact with each other. The clamps $a^2$ and $a^3$, which extend below but not above the cables, and which are secured together by a bolt $a^4$, serve to hold the two cables $a$ $a'$ together and also to provide means of suspension for the parts below. A similar function is performed by the clamps $b^2 b^3$ upon the cables $b$ $b'$, which clamps are held together by the bolts $b^4$.

$c$, $c'$, $c^2$, and $c^3$ are the wheels of the load-carriage adapted to run upon the trackways. Where these trackways are cables, as shown in the drawings, each pair of wheels $c$ $c'$ and $c^2$ $c^3$ serves to preserve the distance between the two cable tracks. Between the wheels $c$ $c'$, and preferably concentric with the same, is mounted the sheave $d$. Between the wheels $c^2$ and $c^3$, and preferably concentric with the same, is mounted the sheave $d'$. The frame $e$ $e'$ connects the opposite ends of the carriage.

$f$ is the fall-block, which is suspended by the fall-rope $f'$, passing over the sheaves $d$ and $d'$.

$h$ and $h'$ are rigid hangers suspended from the frame $e'$, to which is rigidly connected a deflector $h^2$, having differently-formed ends, as hereinafter more particularly described in two forms.

The fall-rope carrier consists of sheaves $i$ $i'$, mounted side by side within a cast-metal pocket $j$. The tops of these sheaves rise above the pocket, as shown; but on either side of the sheaves are upward projections $j'$ $j^2$ from the pocket, which, after projecting vertically upward to the level of the top of the sheaves, flare outwardly with an upward inclination, so as to serve for centering the fall-rope onto the sheaves. It remains now to provide for supporting the fall-rope-carrier pockets $j$ so that while normally in the position for supporting the fall-rope they may be thrown out of the path of the carriage and pass suspended therefrom as the carriage approaches. In this respect the three forms differ, so that they can best be described separately.

Referring now, specifically, to the form shown in Figs. 1, 2, and 3, the pocket $j$ is bolted to a horizontally-swinging arm $k$, which is secured to the hanger $l$ from the clamps $b^2 b^3$ by a double-acting spring-hinge $m$, whereby the arm $k$ and the pocket $j$ are permitted to swing freely in either direction.

$l'$ is a hanger fixed to the clamps $a^2 a^3$, upon the lower end of which is a shelf $m'$, upon which a flange $m^2$ from the pocket $j$ rests when the pocket is in its normal position. The upper corners of the shelf $m'$ are beveled, so as to act as inclines to insure the proper engagement between the shelf $m'$ and the flange $m^2$ as the rope-carrier swings into its normal position.

In order to insure steadiness, the hanger $l$ is supported by two pairs of clamps, as shown in Figs. 1 and 2. Likewise the hanger $l'$ is supported by two pairs of clamps. The deflector $h^2$ is provided on each extremity with a corresponding incline $n$, which strikes the pocket $j$ as the carriage approaches and pushes that pocket out of its normal position and under the trackway $b$ $b'$, so as to permit the carriage to pass. As soon as the deflector $h^2$ has passed, the pocket $j$ will be swung back to its normal position by the spring-hinge.

I will now describe the form shown in Figs. 4 and 5, where the pocket $j$ is swung out of its normal position vertically instead of horizontally. Here the pocket $j$ is fixed to an arm $k'$, which is pivoted between the hangers $l^2$ and $l^3$ from the trackway $b^2$ and $b^3$, and which extends beyond the pivot and there carries the weight $p$. $l^4$ is a hanger from the trackway $a\ a'$, which is notched at $l^5$ to form a rest for the flange $m^3$ on the pocket $j$. The deflector $h^2$ is provided at either end with a corresponding horn $n'$, adapted, as the carriage approaches a rope-carrier, to enter beneath the flange $m^3$ and throw the pocket $j$ upward into the position shown in dotted lines, Fig. 5, enabling the carriage and the parts connected therewith to pass.

I will now describe the form shown in Fig. 6, where the pocket $j$ is reciprocated or moved backward substantially in a vertical plane. Here the pocket $j$ is fixed to an arm $r$. The arm $r'$ is fixed to the trackway $b^2\ b^3$. The horizontal portions of the arms $r$ and $r'$, which are substantially parallel, are connected by the parallel links $r^2$ and $r^3$. The pocket $j$ may thus move from the position shown in full lines, Fig. 6, which is its normal position for supporting the rope, into the position shown in dotted lines, which enables the carriage to pass, the links $r^2$ and $r^3$, constituting a hanger, acting in conjunction with the hanger $l^4$, but carrying the sheaves $i\ i'$ and pocket $j$, and movable laterally, so as to be thrust outward on the approach of the carriage and thus take the fall-rope sheaves $i\ i'$ apart from the hanger $l^4$ and permit the vertical part of the fall-rope to pass. The hanger $l^4$ and the notch $l^5$ and the flange $m^3$ are similar to the corresponding parts in the second form of construction. The horns $n'$ likewise bear similar relation, but are both constructed of the form shown at $n'$ in Fig. 6 to adapt them to produce the somewhat different movement of the pocket $j$.

I will now return to a form of construction in which the three modifications described are alike.

The fall-rope is never expected to get below the rope-carrier pocket $j$ when in its normal position; but if this should occur by accident it might cause a collision. I, however, give the bottom of the pocket the inclined form shown, which, together with the deflector $p'$, will tend as the carriage approaches and lifts the rope to deflect it in the direction of the arrow, Fig. 3, until it occupies the position beneath the projection $j'$ or $m^3$ indicated in dotted lines, Figs. 1, 3, 4, and 5. As the carriage continues to approach, the pressure of the rope upon the projection $j'$ or $m^3$ will be somewhat in the direction of the arrow, Fig. 1, and calculated, in the case of the form shown in Figs. 1 and 3, to push the projection $j'$ forward in the direction in which the carriage is going until it has swung off from the top of the rope and allowed the rope to return to its normal position. In the case of the modification shown in Figs. 4 and 5 the pressure of the rope on the under side of the projection $m^3$ causes the rope-carrier to swing upward off from the top of the rope and allow the rope to return to its normal position, and in the case of the modification shown in Fig. 6 the pressure of the rope on the under side of the projection $m^3$ causes the rope-carrier to move in a lateral and upwardly-inclined direction off from the top of the rope and allow the rope to return to its normal position. Thus with either modification any collision is prevented, such as might occur if the rope should be held positively beneath the rope-carrier upon the approach of the carriage.

Although I have shown an inclined under surface for the rope-carrier as facilitating the mode of operation for the removal of the rope from beneath the rope-carrier upon the approach of the carriage, yet in some cases another form of surface might answer, providing always that it were not of such form as to absolutely prevent the rope-carrier from disengaging with the rope by being moved out of its normal position.

The pocket $j$, wherein the sheaves $i$ and $i'$ are sunk, may be filled with oil or other lubricating material, which, being picked up by the sheaves, is deposited upon the rope and serves to properly lubricate the same and at the same time to prevent the wheels and rope from cutting each other.

I am aware of my Letters Patent Nos. 474,047 and 496,203 and of the patent to North, No. 470,948, and make no claim to what is therein claimed. As one feature of distinction common to all three of the forms above described I believe that I am the first one to construct a conveying apparatus in which the rope having fallen below the rope-carrier is automatically brought above the same. As means for accomplishing this end it will be observed that in my apparatus, while the normal position in which the rope $f'$ is supported by the wheel $d$ is substantially centrally above the rollers $i\ i'$, the opening over the projection $m^3$, through which the rope passes as the rope-carrier moves into and out of supporting position, is on one side of said normal position of the rope, (the left-hand side in Figs. 3 and 5,) whereas the support for the rope-carrier (in the form shown) from the cables $a\ a'$ is on the opposite side of said normal position of the rope $f'$. Thus the pressure of the rope $f'$ as the carriage approaches the rope-carrier must tend always to move the rope-carrier toward the side of the rope-carrier support, and it is evident that the movement in this direction is what is required to enable the rope $f'$ to reach and get into the open side of the rope-carrier.

I claim—

1. In a conveying apparatus a rope-carrier provided with an underneath deflecting-surface and an opening at one side for the passage of the rope in combination with a support for the carrier on the opposite side of the normal position of the rope from said opening, substantially as described.

2. In a conveying apparatus, in combination a cable or trackway, a carriage, a rope-carrier and means for supporting said rope-carrier and permitting of its lateral movement; the plane of the under surface of said rope-carrier being inclined at an obtuse angle with the direction of pressure of the rope as the carriage approaches, whereby the lifting of the rope by the approach of the carriage causes the lateral movement of the rope-carrier in the event that the rope has fallen below the rope-carrier.

3. In a conveying apparatus, in combination a cable or trackway, a carriage, a rope-carrier, means for supporting said rope-carrier and permitting of its lateral movement and a projection from the free end of said rope-carrier; the plane of the under surface of said rope-carrier being inclined at an obtuse angle with the direction of pressure of the rope as the carriage approaches whereby the rope will, if underneath it, be deflected to a position beneath said projection.

4. In a conveying apparatus containing two parallel cables or trackways, a carriage to travel thereon, a rope supported by said carriage in combination with said parts, a rope-carrier connected with one of said cables or trackways and extending into the space between the same, means whereby said rope-carrier is normally held in said position; said rope-carrier being provided with an under surface adapted to permit the rope-carrier to move off from the rope upon the approach of the carriage, substantially as described.

5. In a conveying apparatus containing two parallel cables or trackways, a carriage to travel thereon and a rope supported by said carriage in combination with said parts, a rope-carrier connected with one of said cables or trackways and extending into the space between the same, means whereby said rope-carrier is normally held in said position and an inclined under surface connected with said rope-carrier whereby the lifting of the rope on the approach of the carriage tends to disengage it from the rope-carrier, substantially as described.

6. In a conveying apparatus, in combination, a load-carriage provided with a supporting grooved wheel and a trackway composed of a plurality of cables substantially equal in diameter laid together side by side between the flanges of said wheel whereby said wheel is supported and means additional to and apart from said wheel whereby said cables are held together out upon the span substantially as described.

7. In a conveying apparatus, in combination, two cables, a load-carriage containing a fall-rope sheave and wheels, as $c$, $c'$, by which the distance between said cables is preserved, a fall-rope extending horizontally along the span and hanging vertically from said sheave, a hanger connected with one cable and extending downward on one side of the horizontal part of said fall-rope, a fall-rope rest normally bridging the space below the horizontal part of said fall-rope, a supporting member, as $r'$, connected with the other cable, a hanging link, as $r^2$, pivotally connected with said member and with said rest and deflecting mechanism whereby said rest is swung to one side on said link as the carriage passes, substantially as described.

THOS. SPENCER MILLER.

Witnesses:
J. E. GREER,
FRED S. KEMPER.